No. 764,666. PATENTED JULY 12, 1904.
J. A. KRAY.
TRAP.
APPLICATION FILED OCT. 25, 1901.
NO MODEL.

Witnesses
C. G. Hensel.
C. G. Bauler.

Inventor.
John A. Kray.
By
Wm. R. Gerhart
His Atty.

No. 764,666. Patented July 12, 1904.

UNITED STATES PATENT OFFICE.

JOHN A. KRAY, OF LANCASTER, PENNSYLVANIA, ASSIGNOR OF ONE-HALF TO HENRY FRANCIS MYERS, OF LANCASTER, PENNSYLVANIA.

TRAP.

SPECIFICATION forming part of Letters Patent No. 764,666, dated July 12, 1904.

Application filed October 25, 1901. Serial No. 79,908. (No model.)

*To all whom it may concern:*

Be it known that I, JOHN A. KRAY, a citizen of the United States, residing at Lancaster, in the county of Lancaster and State of Pennsylvania, have invented certain Improvements in Traps, of which the following is a specification.

This invention relates to improvements in traps for sinks and other like devices so constructed as to allow water to pass down, but not to allow reflow of air or gases; and the objects of my invention are, first, to simplify and cheapen the construction of such traps and, second, to facilitate the cleaning of the same. I attain these objects by the mechanism illustrated in the accompanying drawings, forming a part of this specification, and in which—

Figure 1:
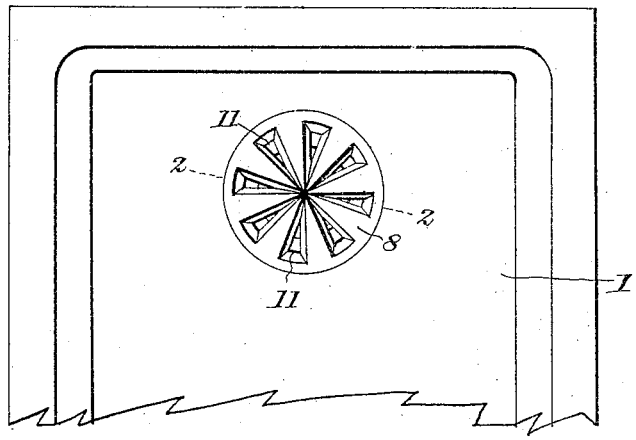
Figure 3:
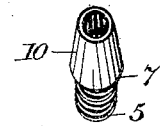
Figure 2:
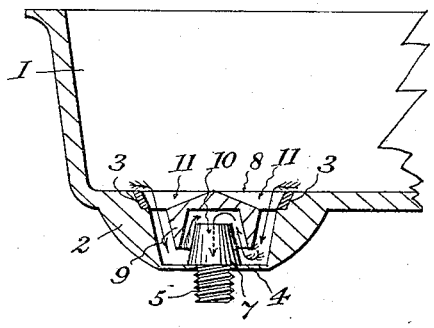
Figure 4:
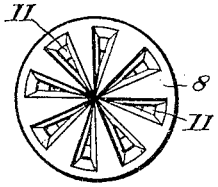

Figure 1 is a plan view of the end of a sink, showing the entrance to the trap; Fig. 2, a vertical section of the trap through broken line 2 2 of Fig. 1 and of a portion of the sink; Fig. 3, a perspective view of the outlet construction, and Fig. 4 a perspective view of the strainer of the trap.

Similar numerals indicate like parts throughout the several views.

Referring to the drawings, 1 indicates a section of a sink.

2 is a bowl or receiver formed under and with one end of the sink. Bowl 2 is semicircular in vertical section, though it may be of any other convenient shape, and around the upper rim of bowl 2 is an annular recess 3. In bottom 4 of bowl 2 is an opening, wherethrough passes the lower end 5 of the outlet-nozzle and which is threaded, as shown, to facilitate its connection with the discharge-pipe. (Not illustrated, as it forms no part of this invention.) On said nozzle is formed a shoulder 7, that bears on the bottom of bowl 2.

8 indicates the strainer, and 9 a downwardly-extending tubular cap or shield formed on the under side of strainer 8. Strainer 8 preferably rests loosely in recess 3 of bowl 2, and cap 9 embraces or surrounds the upper end 10 of the nozzle in the bottom of bowl 2, which end 10 extends upward a sufficient distance to form, with cap 9, a trap, whereby solid matter is prevented from passing out through nozzle 5. As will be seen in the drawings, the upper end of cap or shield 9 is closed, the openings 11 of strainer 8 surrounding said upper end of cap or shield 9.

The advantages of my invention are that all refuse matter can be taken out of the bowl simply by removing strainer 8 and that by unscrewing nozzle 5 from the discharge-pipe all the parts can be renewed or repaired without breaking or cutting any of said parts.

Having thus described my invention, what I claim as new, and desire to secure by Letters Patent, is—

1. The combination, in a trap, of a bowl having a recess around the upper edge thereof, a removable nozzle in the bottom of the bowl and having an end extending upward above said bottom, a shoulder on the nozzle and resting on the bottom of the bowl, a removable strainer covering the inlet-opening to the bowl and resting in said recess, and a cap formed with the strainer and surrounding the upwardly-extending end of the nozzle, for the purpose specified.

2. The combination, in a trap, of a bowl having a recess around the upper edge thereof, a removable nozzle in the bottom of the bowl and having an end extending upward above said bottom, a shoulder on the nozzle and resting on the bottom of the bowl, the lower end of the nozzle extending below the bottom of the bowl and being adapted to be connected with a pipe, a removable strainer covering the inlet-opening to the bowl and resting in said recess, and a cap formed with the strainer and surrounding the upwardly-extending end of the nozzle, for the purpose specified.

JOHN A. KRAY.

Witnesses:
C. G. BASSLER,
WM. R. GERHART.